United States Patent
Ola-Hagstrand et al.

(10) Patent No.: US 8,969,449 B2
(45) Date of Patent: Mar. 3, 2015

(54) DISCOLOUR-FREE SILANOL CONDENSATION CATALYST CONTAINING POLYOLEFIN COMPOSITION

(75) Inventors: Per Ola-Hagstrand, Stenungsund (SE); Magnus Palmlof, Västra Frölunda (SE); Perry Nylander, Göteborg (SE); Jeroen Oderkerk, Stenungsund (SE)

(73) Assignee: Borealis Technology Oy, Porvoo (FI)

( * ) Notice: Subject to any disclaimer, the term of this patent is extended or adjusted under 35 U.S.C. 154(b) by 568 days.

(21) Appl. No.: 12/064,339

(22) PCT Filed: Aug. 30, 2006

(86) PCT No.: PCT/EP2006/008491
§ 371 (c)(1),
(2), (4) Date: Apr. 30, 2008

(87) PCT Pub. No.: WO2007/025742
PCT Pub. Date: Mar. 8, 2007

(65) Prior Publication Data
US 2008/0227898 A1    Sep. 18, 2008

(30) Foreign Application Priority Data
Aug. 31, 2005    (EP) ..................... 05018918

(51) Int. Cl.
| C08K 5/00 | (2006.01) |
| C08K 5/51 | (2006.01) |
| C08L 23/02 | (2006.01) |
| C08L 23/06 | (2006.01) |
| C08L 43/04 | (2006.01) |
| C08L 51/06 | (2006.01) |

(52) U.S. Cl.
CPC ............... *C08K 5/0025* (2013.01); *C08L 23/06* (2013.01); *C08K 5/51* (2013.01); *C08L 43/04* (2013.01); *C08L 51/06* (2013.01); *C08L 2312/08* (2013.01)
USPC ........................................................ 524/147

(58) Field of Classification Search
CPC ........ C08K 5/0025; C08K 5/51; C08L 23/06; C08L 23/02; C08L 43/04; C08L 51/06; C08L 2312/08; C08L 2666/24
USPC ........................................................ 524/147
See application file for complete search history.

(56) References Cited

U.S. PATENT DOCUMENTS

| 3,646,155 | A | | 2/1972 | Scott |
| 4,117,195 | A | | 9/1978 | Swarbrick et al. |
| 4,297,310 | A | | 10/1981 | Akutsu et al. |
| 4,351,876 | A | | 9/1982 | Doi et al. |
| 4,397,981 | A | | 8/1983 | Doi et al. |
| 4,413,066 | A | | 11/1983 | Isaka et al. |
| 4,446,283 | A | | 5/1984 | Doi et al. |
| 4,456,704 | A | | 6/1984 | Fukumura et al. |
| 4,574,133 | A | | 3/1986 | Umpleby |
| 5,420,208 | A | | 5/1995 | Reid |
| 6,005,055 | A | * | 12/1999 | Dammert et al. .......... 525/326.5 |
| 2003/0162870 | A1 | * | 8/2003 | Kimura et al. ................ 524/127 |
| 2004/0127641 | A1 | * | 7/2004 | Fagrell et al. .................. 525/63 |

FOREIGN PATENT DOCUMENTS

| EP | 0 736 065 | 2/2000 |
| EP | 1 309 631 | 4/2005 |
| EP | 1 309 632 | 4/2005 |
| EP | 1 254 923 | 8/2006 |
| WO | WO 95/17463 | 6/1995 |
| WO | WO 2005/003199 | 1/2005 |

OTHER PUBLICATIONS

Dover Chemical Corporation Information Sheet.*
International Search Report for International Application No. PCT/EP2006/008491.
European Search Report for Application No. EP 05 01 8918.

* cited by examiner

*Primary Examiner* — Angela C Scott
(74) *Attorney, Agent, or Firm* — Fay Sharpe LLP

(57) ABSTRACT

The present invention relates to a polyolefin composition comprising a crosslinkable polyolefin with hydrolysable silane groups and a silanol condensation catalyst, and (A) a compound containing one or more $PO_m(O_nR)(O_oR')(O_pR'')$ groups, wherein R, R', and R'' are the same or different organic residues; m is 0 or 1; n, o, and p each are 0 or 1; and n+o+p=1 to 3; a master batch for a crosslinkable polyolefin composition comprising a polymer and a silanol condensation catalyst and component (A), a stabilized polyolefin containing cross-linked silane groups wherein cross-linking has been performed by the use of a silanol condensation catalyst, further comprising component (A), and to the use of component (A) for stabilizing a polyolefin composition comprising a crosslinkable polyolefin with hydrolysable silane groups and a silanol condensation catalyst. The polyolefin composition of the invention can be used for pipe, wire & cable, film, fiber and molding applications.

15 Claims, No Drawings

DISCOLOUR-FREE SILANOL CONDENSATION CATALYST CONTAINING POLYOLEFIN COMPOSITION

The present invention relates to a polyolefin composition comprising a crosslinkable polyolefin with hydrolysable silane groups and a silanol condensation catalyst, a master batch for a crosslinkable polyolefin composition comprising a polymer and a silanol condensation catalyst, a stabilized polyolefin containing cross-linked silane groups wherein cross-linking has been performed by the use of a silanol condensation catalyst, and to the use of a stabilizer mixture for stabilizing a polyolefin composition comprising a crosslinkable polyolefin with hydrolysable silane groups and a silanol condensation catalyst. The polyolefin composition of the invention can be used for pipe, wire & cable, film, fibre and moulding applications.

It is known to cross-link polyolefins by means of additives as this improves the properties of the polyolefin such as mechanical strength and chemical heat resistance. Cross-linking may be performed by condensation of silanol groups contained in the polyolefin which can be obtained by hydrolysation of silane groups. A silane compound can be introduced as a cross-linkable group e.g. by grafting the silane compound onto a polyolefin, or by copolymerisation of olefin monomers and silane group containing monomers. Such techniques are known e.g. from U.S. Pat. No. 4,413,066, U.S. Pat. No. 4,297,310, U.S. Pat. No. 4,351,876, U.S. Pat. No. 4,397,981, U.S. Pat. No. 4,446,283 and U.S. Pat. No. 4,456,704.

For cross-linking of such polyolefins, a silanol condensation catalyst must be used. Conventional catalysts are for example tin-organic compounds such as dibutyl tin dilaurate (DBTDL). It is further known that the cross-linking process advantageously is carried out in the presence of acidic silanol condensation catalysts. In contrast to the conventional tin-organic catalysts the acidic catalysts allow cross-linking to quickly take place already at room temperature. Such acidic silanol condensation catalysts are disclosed for example in WO 95/17463. The contents of this document is enclosed herein by reference.

The silanol condensation catalyst usually is added to the silane-group containing polymer by compounding the polymer with a so-called master batch, in which the catalyst, and optionally further additives are contained in a polymer, e.g. polyolefin, matrix in concentrated form.

However, it is a problem that such silanol condensation catalyst containing master batches, in particular master batches which contain an acidic, e.g. a sulphonic acid, catalyst, suffer from a typical yellow/brownish colour, i.e. a discoloration, as compared to the colourless matrix polymer as such.

It is furthermore known that it is necessary to add stabilizers to a polyolefin in order to ensure its long-term stability. In particular, stabilizers are added to the polyolefin which protect it from degradation caused by thermal oxidation, UV-radiation, processing, oxidative degradation and by penetration of metal ions, such as copper ions.

The stabilizer usually is added to the polyolefin together with the silanol condensation catalyst with the master batch. However, it has been found that typical stabilizers used, such as the butylated reaction product of p-cresol and dicyclopentadiene (Lowinox CPL™) or 1,3,5-tri-methyl-2,4,6-tris-(3,5-di-tert.butyl-4-hydroxyphenyl)benzene (Irganox 1330 ™), dramatically increase the discoloration of the master batch, i.e. dramatically deepen the yellow/brownish colour of the master batch. Even a polymer without an antioxidant gets brownish from the catalyst.

As a result of the discoloration of the master batch, also the final products, i.e. the silane-group containing polyolefin after having been compounded with the master batch, show a yellow/brownish colour. Such a discoloration, however, is highly undesired because the final product appears degraded or appears degraded in a relative short time, and furthermore the product it is difficult to pigment, at least to yield light colours.

It is therefore a first object of the present invention to provide an additive mixture for a silane-group containing polyolefin comprising a silanol condensation catalyst, in particular an acidic silanol condensation catalyst, which decreases the discoloration of the master batch, if used, and, even more importantly, decreases discoloration of the final product.

Furthermore, it is known that for a stabilised polyolefin, the oxygen induction time (OIT) is a crucial parameter. The longer the OIT, the better is the stabilisation of the polymer, and hence a long OIT is desirable.

It is accordingly a second object of the present invention to provide an additive mixture for a silane-group containing polyolefin comprising a silanol condensation catalyst, in particular an acidic silanol condensation catalyst, which shows an increased OIT.

Of course, the components of the additive mixture must furthermore not cause exudation problems, must not give rise to bad smell and must not inhibit the activity of the catalyst.

It has now surprisingly been found that the above objects can be achieved by an additive mixture which in addition to a silanol condensation catalyst comprises a P-containing compound and, optionally, an usual antioxidant.

The present invention therefore provides a polyolefin composition comprising a crosslinkable polyolefin with hydrolysable silane groups and a silanol condensation catalyst, characterized in that it further comprises:

(A) a compound containing one or more $PO_m(O_nR)(O_oR')(O_pR'')$ groups, wherein
R, R', and R'' are the same or different organic residues; m is 0 or 1; n, o, and p each are 0 or 1; and n+o+p=1 to 3.

It has been found that the polyolefin composition according to the invention shows an significantly improved discoloration behaviour, i.e. the yellow/brownish discoloration does not appear or is at least significantly reduced. Thus, compound (A) can also be designated as acting as a "whitener" or a discoloration co-agent. At the same time, compound (A) acts as a process stabilizer that is active in the compounding and cross-linking step.

Preferably, the polyolefin composition of the invention comprises (B) a non-phosphorous containing antioxidant.

It has been found that in particular the OIT is improved much more than it could have been expected from the OIT values obtained with compounds (A) or (B) alone.

In a preferred embodiment, compound (A) is a compound according to the formula:

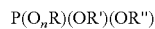

wherein
R, R' and R'' are the same or different and at least R, R', or R'' is a residue comprising at least 2, more preferably at least 6 C-atoms, and most preferably at least 10 C-atoms, and
n is 0 or 1.

In a further preferred embodiment, compound (A) is a compound according to the formula:

wherein

R, R' and R" are the same or different and at least R, R', or R" is a substituted phenyl residue comprising at least one tert.-butyl group or a linear hydrocarbyl group comprising at least 10 C-atoms, and n is 0 or 1.

Compound (A) may preferably e.g. be chosen from the following compounds: Bis(2,4-dicumylphenyl)pentaerythritoldiphosphite (Doverphos S-9228 ™, CAS-no. 154862-43-8); Tris(2,4-di-t-butylphenyl)phosphite (Irgaphos 168 FF™, CAS-no. 31570-04-4); Di-stearyl-pentaerythrityl-di-phosphite (Weston 618™, CAS-no. 3806-34-6); Tetrakis-(2,4-di-t-butylphenyl)-4,4'-biphenylen-di-phosphonite (Irgafos P-EPQ FD™, CAS-no. 38613-77-3 119345-01-6), Sumilizer GP™ (CAS-no 203255-81-6), Ultranox 624™ (CAS-no 26741-53-7), Irgafos 38™ (CAS-no 145650-60-8), Ultranox 641™ (CAS-no 161717-32-4), Reophos RDP™ (CAS-no 57583-54-7), Dequest 2016D™ (CAS-no 3794-83-0), and Dequest 4066™ (sodium salt of diethylene triamine penta (methylene phosphonic acid)).

In a particularly preferred embodiment, compound (A) is a compound according to formula:

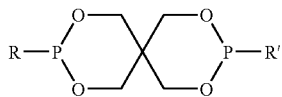

wherein R and R' each is the same or different and is a residue comprising at least 6 C-atoms, more preferably at least 10 C-atoms, and most preferably is a substituted phenyl residue comprising at least one tert.-butyl group or a linear hydrocarbyl group comprising at least 10 C-atoms In the polymer composition according to the invention, compound (A) preferably is present in an amount of from 0.01 to 3 wt. %, more preferably from 0.03 to 1 wt %, and most preferably from 0.04 to 0.4 wt %.

Preferably, the total amount of compound (A) and (B) in the final polymer composition is from 0.02 to 3 wt. %, more preferably from 0.1 to 2 wt %, and most preferably from 0.2 to 1 wt %.

Compound (B) preferably is an antioxidant which is neutral or acidic, must comprise a sterically hindered phenol group or aliphatic sulphur groups. Such compounds are disclosed in EP 1 254 923 to be particularly suitable antioxidants for stabilisation of polyolefins containing hydrolysable silane groups which are crosslinked with a silanol condensation catalyst, in particular an acidic silanol condensation catalyst. Other preferred antioxidants are disclosed in WO2005003199A1.

More preferably, compound (B) is a stabilizer which is neutral or acidic, does not contain ester groups, does not contain phosphorous, and is a compound according to the formula:

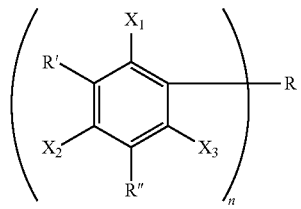

wherein

R is an non-substituted or substituted aliphatic or aromatic hydrocarbyl radical which may comprise heteroatoms;

R' is a hydrocarbyl radical,

R" is a hydrocarbyl radical, and R' and/or R" being a bulky radical, $X_1$, $X_2$ and $X_3$ is the same or different H or OH, whereby at least $X_1$, $X_2$ or $X_3$ is OH, and n is 1 to 4;

or a compound according to the formula:

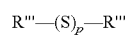

wherein

R''' is an aliphatic hydrocarbyl radical and p is 1 to 6.

Again, such compounds have been disclosed in EP 1 254 923, and all non-phosphorous containing compounds described as preferred therein are also preferred as compounds (B) for the present invention.

Particularly preferred examples for compound (B) are 1,3,5-tri-methyl-2,4,6-tris-(3,5-di-tert.butyl-4-hydroxyphenyl) benzene (Irganox 1330™, CAS-no. 1709-70-2); 2,5,7,8-Tetramethyl-2(4',8',12'-trimethyltridecyl)-chroman-6-ol (Irganox E201™, CAS-no. 10191-41-0); Butylated reaction product of p-cresol and dicyclopentadiene (Ralox LC, CAS-no. 31851-03-3, 68610-51-5) and tetrakis-(methylene-(3,5-di-tert.butyl-4-hydrocinna-mate)methane (Irganox 1010™).

Preferably, compound (B) is present in the composition in an amount of from 0.01 to 3 wt %, more preferably 0.05 to 2 wt %, and most preferably 0.08 to 1.5 wt %.

Examples for the silanol condensation catalysts of the polymer composition comprise Lewis acids, inorganic acids such as sulphuric acid and hydrochloric acid, and organic acids such as citric acid, stearic acid, acetic acid, sulphonic acid and alkanoic acids as dodecanoic acid, or a precursor of any of the compounds mentioned.

Preferably, a Brönsted acid, or a precursor thereof, is used as acidic silanol condensation catalysts, further preferred a sulphonic acid, and still further preferred an organic sulphonic acid.

Still more preferably, the Brönsted acid is an organic sulphonic acid comprising 10 C-atoms or more, more preferably 12 C-atoms or more, and most preferably 14 C-atoms or more, the sulphonic acid further comprising at least one aromatic group which may e.g. be a benzene, naphthalene, phenantrene or anthracene group. In the organic sulphonic acid, one, two or more sulphonic acid groups may be present, and the sulphonic acid group(s) may either be attached to a non-aromatic, or preferably to an aromatic group, of the organic sulphonic acid.

Further preferred, the aromatic organic sulphonic acid comprises the structural element:

with Ar being an aryl group which may be substituted or non-substituted, and x being at least 1.

The organic aromatic sulphonic acid silanol condensation catalyst may comprise the structural unit according to the formula one or several times, e.g. two or three times. For example, two structural units according to the formula may be linked to each other via a bridging group such as an alkylene group.

Preferably, Ar is an aryl group which is substituted with at least one $C_4$- to $C_{30}$-hydrocarbyl group, more preferably $C_4$- to $C_{30}$-alkyl group.

Aryl group Ar preferably is a phenyl group, a naphthalene group or an aromatic group comprising three fused rings such as phenantrene and anthracene.

Preferably, in the formula x is 1, 2 or 3, and more preferably x is 1 or 2.

Furthermore, preferably the compound used as organic aromatic sulphonic acid silanol condensation catalyst has from 10 to 200 C-atoms, more preferably from 14 to 100 C-atoms.

It is further preferred that Ar is a hydrocarbyl substituted aryl group and the total compound containing 14 to 28 carbon atoms, and still further preferred, the Ar group is a hydrocarbyl substituted benzene or naphthalene ring, the hydrocarbyl radical or radicals containing 8 to 20 carbon atoms in the benzene case and 4 to 18 atoms in the naphthalene case.

It is further preferred that the hydrocarbyl radical is an alkyl substituent having 10 to 18 carbon atoms and still more preferred that the alkyl substituent contains 12 carbon atoms and is selected from dodecyl and tetrapropyl. Due to commercial availability it is most preferred that the aryl group is a benzene substituted group with an alkyl substituent containing 12 carbon atoms.

The currently most preferred compounds are dodecyl benzene sulphonic acid and tetrapropyl benzene sulphonic acid.

The silanol condensation catalyst may also be precursor of the sulphonic acid compound, including all its preferred embodiments mentioned, i.e. a compound that is converted by hydrolysis to such a compound. Such a precursor is for example the acid anhydride of a sulphonic acid compound, or a sulphonic acid that has been provided with a hydrolysable protective group, as e.g. an acetyl group, which can be removed by hydrolysis.

Furthermore, preferred sulphonic acid catalysts are those as described in EP 1 309 631 and EP 1 309 632, namely a) a compound selected from the group of (i) an alkylated naphthalene monosulfonic acid substituted with 1 to 4 alkyl groups wherein each alkyl group is a linear or branched alkyl with 5 to 40, preferably 5 to 20 carbons with each alkyl group being the same or different and wherein the total number of carbons in the alkyl groups is in the range of 20 to 80 carbons;

(ii) an arylalkyl sulfonic acid wherein the aryl is phenyl or naphthyl and is substituted with 1 to 4 alkyl groups wherein each alkyl group is a linear or branched alkyl with 5 to 40, preferably 5 to 20 carbons with each alkyl group being the same or different and wherein the total number of carbons in the alkyl groups is in the range of 12 to 80;

(iii) a derivative of (i) or (ii) selected from the group consisting of an anhydride, an ester, an acetylate, an epoxy blocked ester and an amine salt thereof which is hydrolysable to the corresponding alkyl naphthalene monosulfonic acid or the arylalkyl sulfonic acid;

(iv) a metal salt of (i) or (ii) wherein the metal ion is selected from the group consisting of copper, aluminium, tin and zinc; and b) a compound selected from the group of (i) an alkylated aryl disulfonic acid selected from the group consisting of the structure:

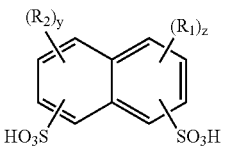

and the structure:

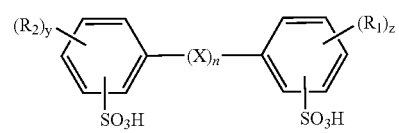

wherein each of $R_1$ and $—R_2$ is the same or different and is a linear or branched alkyl group with 6 to 16 carbons, y is 0 to 3, z is 0 to 3 with the proviso that y+z is 1 to 4, n is 0 to 3, X is a divalent moiety selected from the group consisting of $—C(R_3)(R_4)—$, wherein each of $R_3$ and $R_4$ is H or independently a linear or branched alkyl group of 1 to 4 carbons and n is 1; $—C(=O)—$, wherein n is 1; $—S—$, wherein n is 1 to 3 and $—S(O)_2—$, wherein n is 1; and (ii) a derivative of (i) selected from the group consisting of the anhydrides, esters, epoxy blocked sulfonic acid esters, acetylates, and amine salts thereof which is a hydrolysable to the alkylated aryl disulfonic acid, together with all preferred embodiments of those sulphonic acids as described in the mentioned European Patents.

Preferably, in the polyolefin composition according to the invention the silanol condensation catalyst is present in an amount of 0.0001 to 6 wt %, more preferably of 0.001 to 2 wt %, and most preferably 0.02 to 0.5 wt %.

The present invention generally concerns cross-linkable polyolefins containing hydrolysable silane groups. More preferably the cross-linkable polyolefin is a polyethylene.

The hydrolysable silane groups may be introduced into the polyolefin by copolymerization of e.g. ethylene monomers with silane group containing comonomers or by grafting, i.e. by chemical modification of the polymer by addition of silane groups mostly in a radical reaction. Both techniques are well known in the art.

Preferably, the silane group containing polyolefin has been obtained by-copolymerization. In the case of polyolefins, preferably polyethylene, the copolymerization is preferably carried out with an unsaturated silane compound represented by the formula $$R^1SiR^2_qY_{3-q} \quad (IV)$$

wherein
$R^1$ is an ethylenically unsaturated hydrocarbyl, hydrocarbyloxy or (meth)acryloxy hydrocarbyl group,
$R^2$ is an aliphatic saturated hydrocarbyl group,
Y which may be the same or different, is a hydrolysable organic group and
q is 0, 1 or 2.

Special examples of the unsaturated silane compound are those wherein $R^1$ is vinyl, allyl, isopropenyl, butenyl, cyclohexanyl or gamma-(meth)acryloxy propyl; Y is methoxy, ethoxy, formyloxy, acetoxy, propionyloxy or an alkyl- or arylamino group; and $R^2$, if present, is a methyl, ethyl, propyl, decyl or phenyl group.

A preferred unsaturated silane compound is represented by the formula $$CH_2=CHSi(OA)_3$$

wherein A is a hydrocarbyl group having 1-8 carbon atoms, preferably 1-4 carbon atoms.

The most preferred compounds are vinyl trimethoxysilane, vinyl bismethoxyethoxysilane, vinyl triethoxysilane, gamma-(meth)acryl-oxypropyltrimethoxysilane, gamma (meth)acryloxypropyltriethoxysilane, and vinyl triacetoxysilane.

The copolymerization of the olefin, e.g. ethylene, and the unsaturated silane compound may be carried out under any suitable conditions resulting in the copolymerization of the two monomers.

Moreover, the copolymerization may be implemented in the presence of one or more other comonomers which can be copolymerized with the two monomers. Such comonomers include (a) vinyl carboxylate esters, such as vinyl acetate and vinyl pivalate, (b) alpha-olefins, such as propene, 1-butene, 1-hexane, 1-octene and 4-methyl-1-pentene, (c) (meth)acrylates, such as methyl(meth)acrylate, ethyl(meth)acrylate and butyl(meth)acrylate, (d) olefinically unsaturated carboxylic acids, such as (meth)acrylic acid, maleic acid and fumaric acid, (e) (meth)acrylic acid derivatives, such as (meth)acrylonitrile and (meth)acrylic amide, (f) vinyl ethers, such as vinyl methyl ether and vinyl phenyl ether, and (g) aromatic vinyl compounds, such as styrene and alpha-ethyl styrene.

Amongst these comonomers, vinyl esters of monocarboxylic acids having 1-4 carbon atoms, such as vinyl acetate, and (meth)acrylate of alcohols having 1-4 carbon atoms, such as methyl(meth)-acrylate, are preferred.

Especially preferred comonomers are butyl acrylate, ethyl acrylate and methyl acrylate.

Two or more such olefinically unsaturated compounds may be used in combination. The term "(meth)acrylic acid" is intended to embrace both acrylic acid and methacrylic acid. The comonomer content of the copolymer may amount to 70% by weight of the copolymer, preferably about 0.5 to 35% by weight, most preferably about 1 to 30% by weight.

If using a graft polymer, this may have been produced e.g. by any of the two methods described in U.S. Pat. No. 3,646,155 and U.S. Pat. No. 4,117,195, respectively.

The silane-containing polyolefin according to the invention preferably contains 0.001 to 15% by weight of the silane compound, more preferably 0.01 to 5% by weight, most preferably 0.1 to 2% by weight.

The polyolefin composition of the invention preferably has an oxygen induction time OIT of more than 30 min.

The polymer composition according to the invention may further contain varies additives, such as miscible thermoplastics, further stabilizers, lubricants, fillers, colouring agents and foaming agents.

The silanol condensation catalyst and compound (A) and, optionally, (B) are preferably added to the silane group containing polymer by compounding a master batch, which contains the silanol condensation catalyst and compound (A) and, optionally, (B) in a polymer matrix in concentrated form, with the silane group containing polyolefin.

Accordingly, the present invention also pertains to a master batch for a crosslinkable polyolefin composition comprising a polymer and a silanol condensation catalyst, characterized in that it further comprises (A) a compound containing one or more $PO_m(O_nR)(O_oR')(O_pR'')$ groups, wherein
  R, R', and R'' are the same or different organic residues; m is 0 or 1; n, o, and p each are 0 or 1; and n+o+p=1 to 3.

Of course, all preferred embodiments as concerns the silanol condensation catalyst, compound (A) and compound (B) are also preferred for the master batch of the invention.

Usually, the master batch further comprises a matrix polymer, preferably a polyolefin, more preferably a polyethylene, which may be a homo- or copolymer of ethylene, e.g. low density polyethylene, or polyethylene-methyl-ethyl-butyl-acrylate copolymer containing 1 to 50 percent by weight of the acrylate, and mixtures thereof. More preferably, a high density or medium density polyethylene is used as a matrix polymer. Furthermore, it is preferred that the matrix polymer is a bimodal polymer.

As stated, in the master batch the compounds to be added to the silane group containing polymer are contained in concentrated form, i.e. in a much higher amount than in the final product.

Accordingly, compound (A) preferably is present in the master batch in an amount of from 0.3 to 5 wt %, more preferably from 0.5 to 3.5 wt %.

Compound (B) preferably is present in the master batch in an amount of from 1 to 20 wt %, more preferably from 4 to 15 wt %.

Furthermore, the master batch preferably comprises the acidic silanol condensation catalyst in an amount of from 0.3 to 6 wt %, more preferably from 0.7 to 3.5 wt %.

The master batch preferably is compounded with the silane group containing polymer in an amount of from 1 to 10 wt %, more preferably from 2 to 8 wt %.

Compounding may be performed by any known compounding process, including extruding the final product with a screw extruder or a kneader.

The present invention furthermore pertains to a stabilized polyolefin containing cross-linked silane groups wherein cross-linking has been performed by the use of a silanol condensation catalyst, characterized in that it comprises (A) a compound containing one or more $PO_m(O_nR)(O_oR')(O_pR'')$ groups, wherein
  R, R', and R'' are the same or different organic residues; m is 0 or 1; n, o, and p each are 0 or 1; and n+o+p=1 to 3.

and to the use of (A) a compound containing one or more $PO_m(O_nR)(O_oR')(O_pR'')$ groups, wherein
  R, R', and R'' are the same or different organic residues; m is 0 or 1; n, o, and p each are 0 or 1; and n+o+p=1 to 3;

for stabilizing a polyolefin composition comprising a crosslinkable polyolefin with hydrolysable silane groups and a silanol condensation catalyst.

Still further, the invention pertains to an article, such as a pipe, a wire or a cable, a film, a fibre or a moulded article, more preferably a pipe, comprising the composition of the invention.

The following examples serve to further illustrate the present invention.

EXAMPLES

1. Definitions a) Melt Flow Rate

The melt-flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. and may be determined at different loadings such as 2.16 kg ($MFR_2$).

b) Yellowness Index

The yellowness index was measured according to ASTM E313 (light source: D65, 10 degrees). As an equipment, Spectraflash SF600 was used.

c) Whiteness Index

Whiteness Index was measured as CIE whiteness CIE 1964. As an equipment, Spectraflash SF600 was used.

d) Oxygen Induction Time (OIT)

OIT was measured according to EN728 and ISO TR 10837 at a temperature of 210° C. with $O_2$ atmosphere.

2. Experiments

Master batches were produced comprising as a matrix resin a polyethylene with a density of 954 kg/m3 and a $MFR_2$ of 4.0 g/10 min (BCM 5440), and the further components as indicated in Table 1. In this table, also the amounts of the components in the master batches are indicated. Compounding of the master batches was performed using a Brabender kneader (small chamber, 47 cm³), and 3 mm thick plates were compression moulded at 180° C.

As antioxidants the following compound was used: 1,3,5-tri-methyl-2,4,6-tris-(3,5-di-tert.butyl-4-hydroxyphenyl) benzene (Irganox 1330™, CAS-no. 1709-70-2);

As phosphorous containing stabilizers, the following compounds were used: Bis(2,4-dicumylphenyl)pentaerythritol-diphosphite (Doverphos S-9228 T™, CAS-no. 154862-43-8); Tris(2,4-di-t-butylphenyl)phosphite (Irgaphos 168 FF™, CAS-no. 31570-04-4); Di-stearyl-pentaerythrityl-di-phosphite (Weston 618, CAS-no. 3806-34-6); Tetrakis-(2,4-di-t-butylphenyl)-4,4'-biphenylen-di-phosphonite (Irgafos P-EPQ FD™, CAS-no. 38613-77-3 119345-01-6), Sumilizer GP™ (CAS-no 203255-81-6), Ultranox 624™ (CAS-no 26741-53-7), Irgafos 38™ (CAS-no 145650-60-8), Ultranox 641™ (CAS-no 161717-32-4), Reophos RDP™ (CAS-no 57583-54-7), Dequest 2016D™ (CAS-no 3794-83-0), and Dequest 4066™ (sodium salt of diethylene triamine penta (methylene phosphonic acid)).

As silanol condensation catalyst, linear alkylbenzene sulphonic acid (DDBSA) has been used.

From the obtained master batches the yellowness index and the CIE whiteness were recorded. Furthermore, the colour of the master batches was optically inspected and ranked on a scale of from 1 to 8.

The master batches of Table 1 were compounded with a silane group containing polyethylene having a density of 923 kg/m³, a $MFR_2$ of 0-9 g/10 min and a silane copolymer content of 1.3% by weight (Visico LE 4423™ from Borealis) in a Brabender kneader followed by tape extrusion. 3 mm thick plates were compression moulded at 180° C. The results of the yellowness, whiteness and OIT measurements are also given in Table 1.

TABLE 1

| | Formulation | | | | | | | | | | | | |
|---|---|---|---|---|---|---|---|---|---|---|---|---|---|
| | F1 (Co.) | F2 | F3 | F4 | F5 | F6 | F7 | F8 | F9 | F10 | F11 | F12 | F13 |
| BCM 5440 | 90.3 | 87.3 | 87.3 | 87.3 | 87.3 | 87.3 | 87.3 | 87.3 | 87.3 | 87.3 | 87.3 | 87.3 | 95.3 |
| DDBSA | 1.7 | 1.7 | 1.7 | 1.7 | 1.7 | 1.7 | 1.7 | 1.7 | 1.7 | 1.7 | 1.7 | 1.7 | 1.7 |
| Irganox 1330 | 8 | 8 | 8 | 8 | 8 | 8 | 8 | 8 | 8 | 8 | 8 | | |
| Irganox 1010 | | | | | | | | | | | | 8 | |
| Doverphos S-9228 T | | 3 | | | | | | | | | | 3 | 3 |
| Irgafos 168 | | | 3 | | | | | | | | | | |
| Weston 618 | | | | 3 | | | | | | | | | |
| Irgafos P-EPQ | | | | | 3 | | | | | | | | |
| Sumilizer GP | | | | | | 3 | | | | | | | |
| Irgafos 38 | | | | | | | 3 | | | | | | |
| Ultranox 641 | | | | | | | | 3 | | | | | |
| Reophos RDP | | | | | | | | | 3 | | | | |
| Dequest 2016D | | | | | | | | | | 3 | | | |
| Dequest 4066 | | | | | | | | | | | 3 | | |
| Total | 100 | 100 | 100 | 100 | 100 | 100 | 100 | 100 | 100 | 100 | 100 | 100 | 100 |
| | | | | | | Master batch | | | | | | | |
| CIE whiteness | −76.4 | −36.7 | −67.9 | 25.8 | 22.2 | −57.3 | −51.0 | −35.4 | −44.3 | −31.2 | −5.8 | −0.4 | 38.1 |
| Yellowness | 49.4 | 32.4 | 47.6 | 11.5 | 12.2 | 44.2 | 39.2 | 33.8 | 37.0 | 33.2 | 23.8 | 17.8 | 5.7 |
| Colour rank. [1-6] (POH) | 6 | 3 | 4 | 1 | 2 | 5 | 4 | 3 | 6 | 5 | 3 | 2 | 1 |
| | | | | Visico LE4423 blended with master batch (final blends) | | | | | | | | | |
| CIE whiteness | −94.1 | 45.6 | 28.5 | 54.8 | 36.2 | 12.9 | 42.8 | 45.5 | −30.4 | 44.9 | 47.2 | 55.5 | 52.1 |
| Yellowness | 51.0 | −0.12 | 6.44 | −3.33 | 3.99 | 12.9 | 1.04 | −0.04 | 28.8 | 0.36 | −0.41 | −3.7 | −2.6 |
| OIT/min | 23 | 41 | 42 | 42 | 50 | 46 | 37 | 37 | 28 | 48 | 47 | 36 | 0 |

The invention claimed is:

1. Polyolefin composition comprising a crosslinkable polyolefin with hydrolysable silane groups and a silanol condensation catalyst, characterized in that said silanol condensation catalyst is an organic sulphonic acid comprising 10 C-atoms or more and that said polyolefin composition further comprises (A) from 0.04 to 0.4 wt % of a compound selected from the group consisting of bis(2,4-dicumylphenyl)pentaerythritoldiphosphite and di-stearyl-pentaerythrityl-di-phosphite; and (B) from 0.08 to 1.5 wt % of a non-phosphorous containing antioxidant selected from the group consisting of 1,3,5-tri-methyl-2,4,6-tris-(3,5-di-tert.butyl-4-hydroxyphenyl)benzene, 2,5,7,8-tetramethyl-2(4',8',12'-trimethyltridecyl)-chroman-6-ol, a butylated reaction product of p-cresol and dicyclopentadiene, and tetrakis-(methylene-(3,5-di-tert.butyl-4-hydrocinnamate))-methane.

2. Polyolefin composition according to claim 1 wherein the organic sulphonic acid contains the structural element $$Ar(SO_3H)_x$$

with Ar being an aryl group which may be substituted or non-substituted, and x being at least 1.

3. Polyolefin composition according to claim 1 wherein the silanol condensation catalyst is present in an amount of 0.0001 to 6 wt %.

4. Polyolefin composition according to claim 1 wherein the crosslinkable polyolefin with hydrolysable silane groups is a polyethylene with hydrolysable silane groups.

5. Polyolefin composition according to claim 1 wherein in the crosslinkable polyolefin with hydrolysable silane groups the silane groups are present in an amount of 0.001 to 15 wt %.

6. Polyolefin composition according to claim 1 wherein the composition has an oxygen induction time of more than 30 min.

7. Article comprising the polyolefin composition according to claim 1.

8. Pipe comprising the polyolefin composition according to claim 1.

9. A polyolefin composition according to claim 1, wherein the total amount of compound (A) and antioxidant (B) in the composition is from 0.2 to 1 wt. %.

10. A polyolefin composition according to claim 1, wherein antioxidant (B) is selected from the group consisting of 1,3,5-tri-methyl-2,4,6-tris-(3,5-di-tert.butyl-4-hydroxyphenyl)benzene and tetrakis-(methylene-(3,5-di-tert.butyl-4-hydrocinnamate))-methane.

11. A polyolefin composition according to claim 1, wherein compound (A) is present in an amount of 0.4 wt. %; and wherein antioxidant (B) is present in an amount of 0.15 wt. %.

12. Polyolefin composition comprising a crosslinkable polyolefin with hydrolysable silane groups and a silanol condensation catalyst, characterized in that said silanol condensation catalyst is an organic sulphonic acid comprising 10 C-atoms or more and that said polyolefin composition further comprises
    (A) a compound selected from the group consisting of bis(2,4-dicumylphenyl)pentaerythritoldiphosphite and di-stearyl-pentaerythrityl-di-phosphite; and
    (B) a non-phosphorous containing antioxidant selected from the group consisting of 1,3,5-tri-methyl-2,4,6-tris-(3,5-di-tert.butyl-4-hydroxyphenyl)benzene, 2,5,7,8-tetramethyl-2(4',8',12'-trimethyltridecyl)-chroman-6-ol, a butylate reaction product of p-cresol and dicyclopentadiene, and tetrakis-(methylene-(3,5-di-tert.butyl-4-hydrocinnamate))-methane;
    wherein the amount of compound (A) and (B) is from 0.02 to 3 wt %.

13. Masterbatch for a crosslinkable polyolefin composition comprising a polymer and a silanol condensation catalyst, characterized in that said silanol condensation catalyst is an organic sulphonic acid comprising 10 C-atoms or more and that said masterbatch further comprises
    (A) from 0.5 to 3.5 wt % of a compound selected from the group consisting of bis(2,4-dicumylphenyl)pentaerythritoldiphosphite and di-stearyl-pentaerythrityl-di-phosphite; and
    (B) from 4 to 15 wt % of a non-phosphorous containing antioxidant selected from the group consisting of 1,3,5-tri-methyl-2,4,6-tris-(3,5-di-tert.butyl-4-hydroxyphenyl)benzene, 2,5,7,8-tetramethyl-2(4',8',12'-trimethyltridecyl)-chroman-6-ol, a butylated reaction product of p-cresol and dicyclopentadiene, and tetrakis-(methylene-(3,5-di-tert.butyl-4-hydrocinnamate))-methane.

14. Stabilized polyolefin containing cross-linked silane groups wherein cross-linking has been performed by the use of a silanol condensation catalyst, characterized in that said silanol condensation catalyst is an organic sulphonic acid comprising 10 C-atoms or more and that said stabilized polyolefin comprises
    (A) from 0.04 to 0.4 wt % of a compound selected from the group consisting of bis(2,4-dicumylphenyl)pentaerythritoldiphosphite and di-stearyl-pentaerythrityl-di-phosphite; and
    (B) from 0.08 to 1.5 wt % of a non-phosphorous containing antioxidant selected from the group consisting of 1,3,5-tri-methyl-2,4,6-tris-(3,5-di-tert.butyl-4-hydroxyphenyl)benzene, 2,5,7,8-tetramethyl-2(4',8',12'-trimethyltridecyl)-chroman-6-ol, a butylated reaction product of p-cresol and dicyclopentadiene, and tetrakis-(methylene-(3,5-di-tert.butyl-4-hydrocinnamate))-methane.

15. A stabilized polyolefin containing cross-linked silane groups wherein cross-linking has been performed by the use of a silanol condensation catalyst, characterized in that said silanol condensation catalyst is an organic sulphonic acid comprising 10 C-atoms or more and that said stabilized polyolefin comprises
    (A) a compound selected from the group consisting of bis(2,4-dicumylphenyl)pentaerythritoldiphosphite and di-stearyl-pentaerythrityl-di-phosphite; and
    (B) a non-phosphorous containing antioxidant selected from the group consisting of 1,3,5-tri-methyl-2,4,6-tris-(3,5-di-tert.butyl-4-hydroxyphenyl)benzene, 2,5,7,8-tetramethyl-2(4',8',12'-trimethyltridecyl)-chroman-6-ol, a butylated reaction product of p-cresol and dicyclopentadiene, and tetrakis-(methylene-(3,5-di-tert.butyl-4-hydrocinnamate))-methane
    wherein the total amount of compound (A) and antioxidant (B) from 0.1 to 2 wt. %.

* * * * *